(12) United States Patent
Akahoshi (10) Patent No.: US 8,619,524 B2
(45) Date of Patent: Dec. 31, 2013

(54) RECORDING REPRODUCING APPARATUS AND RECORDING REPRODUCING METHOD

(75) Inventor: Kenji Akahoshi, Yokohama (JP)

(73) Assignees: Hitachi-LG Data Storage, Inc., Tokyo (JP); Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 13/363,980

(22) Filed: Feb. 1, 2012

(65) Prior Publication Data

US 2012/0224465 A1 Sep. 6, 2012

(30) Foreign Application Priority Data

Mar. 4, 2011 (JP) .................................. 2011-047103

(51) Int. Cl.
*G11B 5/09* (2006.01)

(52) U.S. Cl.
USPC ..................................... 369/47.14; 369/53.17

(58) Field of Classification Search
USPC ........................................... 369/47.14, 53.17
See application file for complete search history.

(56) References Cited

U.S. PATENT DOCUMENTS

| | | | |
|---|---|---|---|
| 7,139,145 B1* | 11/2006 | Archibald et al. | 360/53 |
| 7,583,461 B2* | 9/2009 | Kudoh et al. | 360/53 |
| 2005/0175323 A1* | 8/2005 | Hoshizawa | 386/125 |
| 2006/0007801 A1* | 1/2006 | Takashima | 369/44.27 |
| 2008/0239902 A1* | 10/2008 | Hirai | 369/53.17 |
| 2009/0168617 A1* | 7/2009 | Yorimoto | 369/47.14 |
| 2010/0232276 A1 | 9/2010 | Takahashi et al. | |
| 2011/0002206 A1* | 1/2011 | Akahoshi | 369/47.14 |

FOREIGN PATENT DOCUMENTS

WO  WO 2007/114118  10/2007

OTHER PUBLICATIONS

"DVD-RAM technique," edited by Triceps Planning Department and published by Triceps, 2000, w/ English translation thereof.

* cited by examiner

*Primary Examiner* — Wayne Young
*Assistant Examiner* — Brenda Bernardi
(74) *Attorney, Agent, or Firm* — McDermott Will & Emery LLP (57) ABSTRACT

If a recording error has occurred during RAW, then subsequent recording reproducing processing is omitted in a predetermined range, and all blocks omitted in the processing are handled as defective blocks, DFL-registered, and recorded in a replacement area. As a result, it becomes possible to hold down the number of times of recording processing accompanied by seek processing in the RAW processing, and transfer rate lowering can be solved.

16 Claims, 5 Drawing Sheets

RECORDING REPRODUCING APPARATUS AND RECORDING REPRODUCING METHOD

INCORPORATION BY REFERENCE

The present application claims priority from Japanese application JP 2011-047103 filed on Mar. 4, 2011, the content of which is hereby incorporated by reference into this application.

BACKGROUND OF THE INVENTION

The present invention relates to a recording reproducing apparatus and a recording reproducing method. In particular, the present invention relates to a registration method of a defect list (DFL) in an apparatus which conducts recording and reproducing by using a replacement processing data recording area in a medium.

As for a background technique in the present technical field, there is a defect management method called linear replacement, as one of methods for avoiding defects on a disc face and prolonging the disc life. According to the linear replacement, data is not recorded on the defective part, but data is recorded in a replacement area (alternative recording area) provided on the same optical disc. The linear replacement is described in, for example, "DVD-RAM technique" edited by Triceps Planning Department and published by Triceps, 2000.

In the abstract of WO07/119,4118, there is described that "if a defective area extending over a wide range such as an air bubble exists on a disc (1) and it is attempted to conduct recording on that area, there is a possibility that replacement recording in a single block unit will occur frequently and consequently timeout will be caused. Therefore, contiguous defective areas such as the air bubble are predicted on the basis of a predetermined condition, and blocks in a spare area (15) are assigned contiguously as the replacement destination of the contiguous defective areas. In response to a request for recording to the contiguous defective areas, control is executed so as to conduct replacement recording to the assigned replacement destination. As a result, contiguous recording to the replacement destination is made possible and access performance is improved."

SUMMARY OF THE INVENTION

At the present time, there are recording reproducing apparatus which conducts data recording by irradiating laser light from a semiconductor laser to an optical disc-shaped recording medium represented by a CD-R/RW (CD Recordable/Rewritable), DVD±R/RW (DVD±Recordable/Rewritable Disc), DVD-RAM (DVD-Re-writable), and Blu-ray Disc (hereafter referred to as BD). In the rewritable or write once optical disc medium, a defective part is generated on the medium by a scratch resulting from partial damage of the medium, a fingerprint, dirt, degradation of a recording film, or the like. Even if recording is conducted on the defective part, the possibility that it will become impossible to read out data becomes high. As one method for avoiding such a defect of the disc face and prolonging the disc life, there is a defect management method. This method is applied to the DVD-RAM and this fact is described in pp. 29~31 in "DVD-RAM technique" edited by Triceps Planning Department and published by Triceps, 2000. This technique is applied to the BD as well, and a cluster recording of which has failed during recording to a user data area with a cluster taken as the unit, or a cluster recoding of which has been successful but judged in the verification of the cluster to be irreproducible is recorded to a replacement area provided in the disc. In addition, the cluster corresponds to a minimum recording block unit in the present invention. And address information for the detected defective cluster and address information of the cluster recorded in the replacement area are registered in a management area provided in the disc as a defect list (DFL). At the time of reproducing, it becomes possible to maintain the interchangeability by reading the DFL beforehand and reading out the cluster corresponding to the address in which the replacement recording has been conducted, instead of reading a cluster corresponding to a cluster address for which a recording instruction has been issued by a higher rank device, as it is.

When a cluster which could not be recorded in the user data area is recorded to the replacement area, there are two cases. A first case is a case where recording processing itself has failed. A second case is a case where recording has been successful but the cluster is judged to be irreproducible for the reason that, for example, the cluster cannot be corrected as a result of verification.

Hereafter, the former case, that is, the case where the recording processing itself has failed and the replacement processing is conducted will be considered.

For example, it is supposed that the unit of RAW processing is 30 blocks, where the RAW is an abbreviation of "Read After Write" and it literally means the processing of conducting reproducing, that is, verification after recording, and it is supposed a case where, in every block of the RAW object, seek processing to a block in which recording should be conducted cannot be performed because of a scratch or the like on the disc surface, a case where servo slips out during following processing before the start of recording, and a case where recording is suspended during recording because of the servo slip out or the like. If recording of a first block which is the unit of RAW fails, a shift to recording processing of the next second block is conducted, however, it is supposed that the recording of the second block fails in the same way and recording fails up to the final block in the RAW processing in the same way. In other words, in this case, there is a possibility that it will become necessary to conduct recording accompanied by seek processing in all of the 30 blocks. It takes a considerable time as compared with the case where recording processing is conducted contiguously without being accompanied by seek processing. Depending upon the number of blocks which are the units of RAW processing and the number of retries of seek processing, a supposed processing time might be exceeded drastically. This results in a problem of a lowered recording transfer rate.

Therefore, an object of the present invention is to suppress the lowering of the recording transfer rate by paying attention to the registering method of defective blocks.

The object is achieved by, for example, the invention described in Claims.

According to the present invention, it is possible to hold down the number of times of recording processing accompanied by seek processing in the RAW processing and implement the suppression of the transfer rate lowering.

Other objects, features and advantages of the invention will become apparent from the following description of the embodiments of the invention taken in conjunction with the accompanying drawings.

DETAILED DESCRIPTION OF THE EMBODIMENTS

Hereafter, embodiments of the present invention will be described with reference to the drawings.

First Embodiment

Hereafter, an embodiment of the present invention will be described with reference to the drawings.

Figure 1:
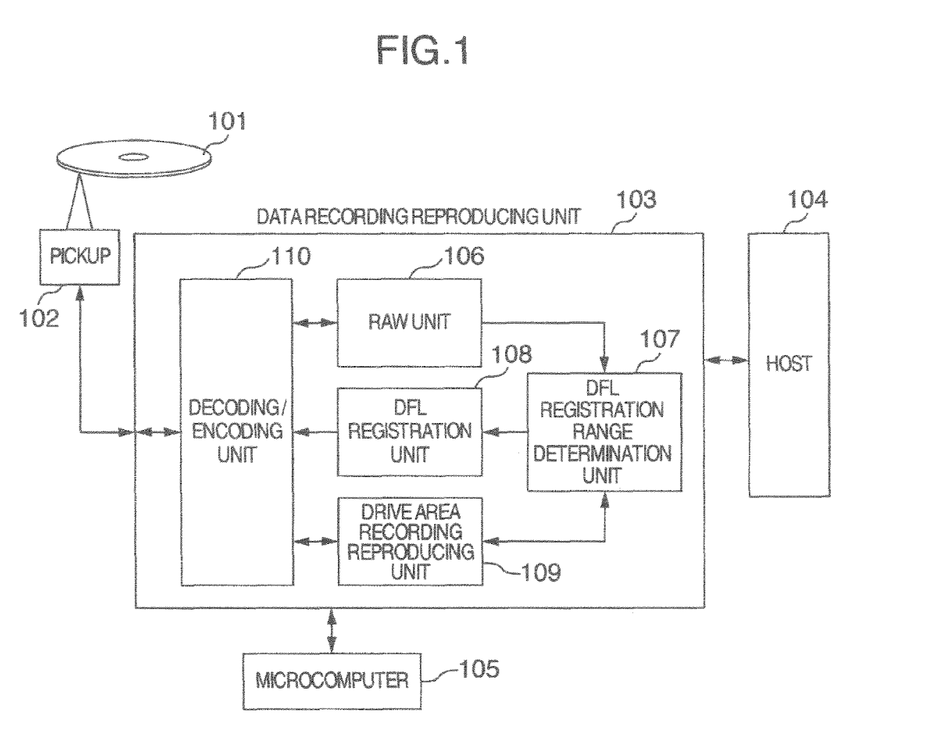
FIG. 1 is a block diagram representing a configuration of a recording reproducing apparatus according to an embodiment of the present invention.

FIG. 1 is a block diagram representing a configuration of a recording reproducing apparatus according to the embodiment of the present invention. The configuration will be described with reference to FIG. 1.

In FIG. 1, a reference numeral 101 denotes an optical disc on which data can be recorded and reproduced. The optical disc 101 has a user data recording area, a disc management information recording area, a replacement processing data recording area, and a drive area for the recording reproducing apparatus to freely record and reproduce. A reference numeral 102 denotes a pickup for reading a recorded signal from the optical disc 101. A reference numeral 103 denotes a data recording reproducing unit. Although not illustrated, the data recording reproducing unit 103 includes all units required to output data read out from the pickup 102 to a host 104 which is an external apparatus or to record data supplied from the host 104 onto the disc, such as a servo control unit for controlling the pickup 102, a unit for conducting data modulation and demodulation, a unit for conducting error correction, a temporary storage unit for temporarily storing data, a temporary storage unit control unit for controlling the temporary storage unit, and a host I/F unit for exchanging information with the host 104 in accordance with a protocol, represented by an ATAPI (AT Attachment Packet Interface). A reference numeral 105 denotes a microcomputer for controlling the data recording reproducing unit. A reference numeral 106 denotes an RAW unit having a data recording unit and a data verification unit to conduct data recording and verification of recorded data by taking a predetermined RAW block as the unit. A reference numeral 107 denotes a DFL registration range determination unit for determining a range in which the defect list (DFL) registration is conducted, on the basis of a recording result in the RAW unit 106. A reference numeral 108 denotes a DFL registration unit for conducting DFL registration on the basis of a result supplied from the DFL registration range determination unit 107. A reference numeral 109 denotes a drive area recording reproducing unit capable of conducting recording and reproducing in the drive area. A reference numeral 110 denotes a decoding/encoding unit for outputting data from the RAW unit 106, the DFL registration unit 108 and the drive area recording reproducing unit 109 to the optical disc 101, or reproducing data supplied from the optical disc 101 and inputting the data to the RAW unit 106 and the drive area recording reproducing unit 109.

Figure 2:
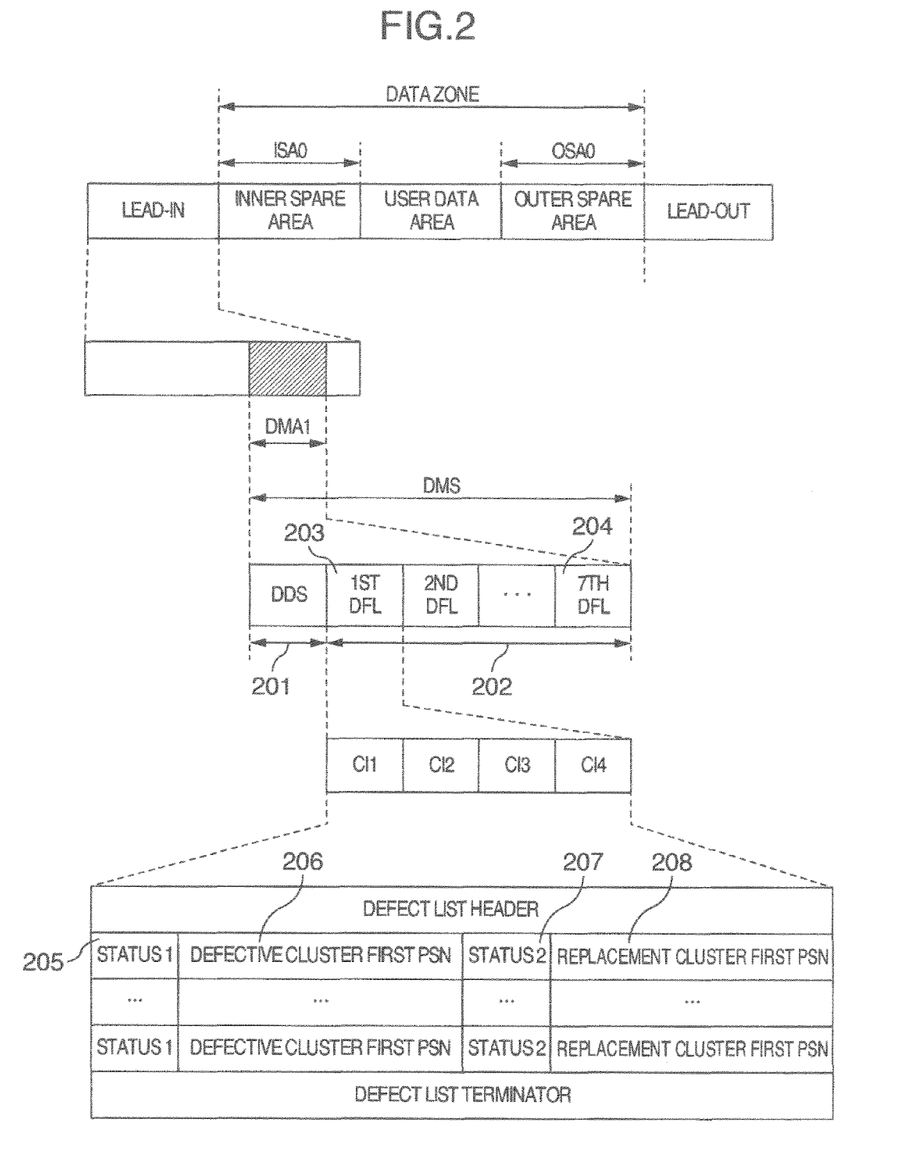
FIG. 2 is a diagram representing a structure of the whole of a single layer rewritable optical disc.

FIG. 2 is a diagram representing a structure of the whole of a single layer rewritable optical disc. Broadly divided, the disc is formed of three areas: a lead-in area, a data zone area, and a lead-out area. In addition, the data zone area is formed of an ISA0 (Inner Spare Area 0) area which is a replacement processing data recording area on inner circumferences, a user data area, and an OSA0 (Outer Spare Area 0) which is a replacement processing data recording area on outer circumferences. A DMA (Disc Management Area) for recording management information of a recording state exists in the lead-in area and the lead-out area. In the rewritable optical disc, DMA1 to DMA4 are defined, however, in this example, only DMA1 is shown for brevity of description. The DMA area is formed of a DMS (Disc Management Structure), and the DMS is formed of a DDS (Disc Definition Structure) 201 and a DFL (Temporary Defect List) 202. The DDS contains DFL arrangement information and disc management information such as capacities of the ISA0 and OSA0. Furthermore, the DFL is used mainly as a list for managing replacement places for defective places on the disc.

The DFL will now be further described. The DFL of the rewritable optical disc is formed of a 1st position of DFL denoted by a reference numeral 203 to a 7th position of DFL denoted by a reference numeral 204. Among them, only one position is actually effective. In the beginning of the recording start, use is started from the 1st position of DFL 203. While overwriting is repeated many times, in some cases it becomes impossible to conduct recording on the block successfully and it is judged in verification that reproducing is impossible. At this time, the effective position shifts to the 2nd position of DFL. As shown in FIG. 2, each position is formed of four clusters. Registration to the DFL is conducted by using one to four clusters. The DFL is stored in a form interposed between a defect list header and a defect list terminator. A format for conducting DFL registration is formed of a status 1 area 205 which represents the registration state of a replacement source, a defective cluster first PSN which represents a replacement source address 206, a status 2 area 207 which represents a registration state of a replacement destination, and a replacement cluster first PSN which represents a replacement destination address 207. Values registered in the status area differ depending upon whether the replacement source block is one cluster or a plurality of contiguous clusters. When conducting replacement of one cluster, the value of the status 1 and the status 2 becomes "0000b" (binary number notation) which indicates a RAD (Re-Allocatable Defect). When replacement of a plurality of contiguous clusters is indicated, two lines indicate one piece of CRD (Contiguous Re-allocated Defect) information unlike the RAD. In a first line, the status 1 area 205 applies a value of "0000b," the replacement source address 206 indicates a head address of the contiguous replacement source clusters, the status 2 area 207 applies a value of "0001b," and the replacement destination address 208 indicates a head address of the contiguous replacement destination clusters. In a second line, the status 2 area 205 applies a value of "0000b," the replacement source address 206 indicates an end address of the contiguous replacement source clusters, the status 2 area 207 applies a value of "0010b," and the replacement destination address 208 indicates an end address of the contiguous replacement destination clusters.

Figure 3:
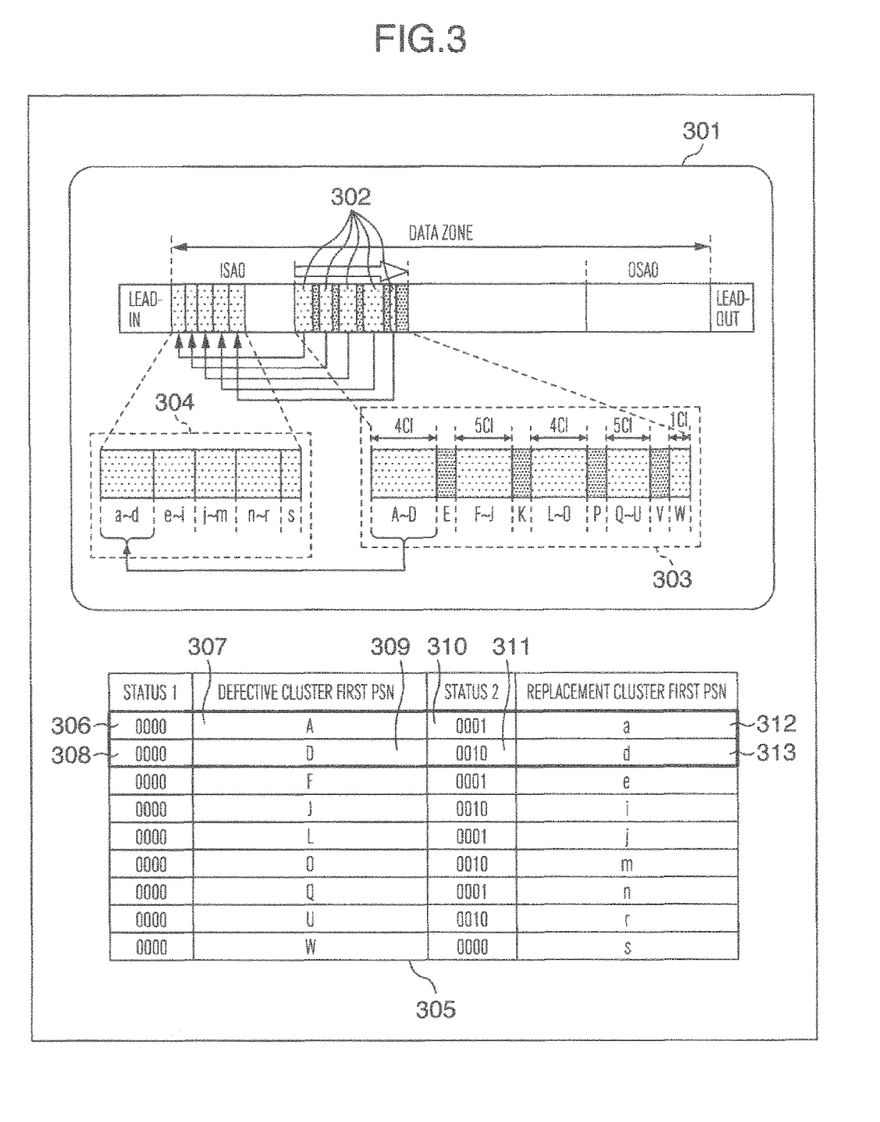
FIG. 3 is a diagram for illustrating a defect processing method in the single layer rewritable optical disc.

A defect processing method for the rewritable optical disc will now be described with reference to FIG. 3.

A reference numeral 301 denotes a disc configuration diagram formatted in a state in which a replacement area having ISA0 and OSA0 is secured. As described with reference to FIG. 2, the lead-in area, the data zone area, and the lead-out area are included, and the ISA0 is secured on the disc inner circumference side of the data zone area whereas the OSA0 is secured on the disc outer circumference side of the data zone area. This area is used as, for example, a replacement area of defects found during data recording.

Considering the case where the application range of the CRD adopted in the write once optical disc is widened to the rewritable optical disc as well, a replacement processing method in the case where defects are found during recording will now be described.

The replacement areas ISA0 and OSA0 in the rewritable optical disc are previously secured at the time of disc format in accordance with a command given by the host apparatus (exactly speaking, a command given by an application). Recording is conducted up to an address indicated by a white arrow in FIG. 3. In the case that, during the recording, defective clusters denoted by a reference numeral 302 in FIG. 3 are found, replacement with a replacement area in the ISA0 is conducted, and this example is shown. Black arrows in FIG. 3 represent correspondence between replacement areas judged to be defective in verification or the like and replacement destination areas which are replacement recording destinations. Furthermore, a DMA in which position information of the defective areas and the replacement areas is recorded is secured in the lead-in area and the lead-out area (see FIG. 2).

It is now supposed that there are defects denoted by 302 during recording and replacement processing is conducted as represented by the black arrows. In 303, each of A to W represents consecutive data corresponding to one cluster, and reference numeral 304 represents an arrangement situation of replacement clusters recorded in the replacement area. It is indicated that only the clusters E, K, P and V are clusters which could be reproduced normally as a result of verification processing and remaining clusters A~D, F~J, L~O, Q~U, and W could not be reproduced. In this case, the clusters judged to be impossible to reproduce are subject to replacement processing with the ISA0 via CRD and RAD registration (it is a matter of course that the replacement processing with the OSA0 may be conducted). Each of clusters a in the ISA0 also represents contiguous data corresponding to one cluster. The clusters A~D, F~J, L~O, Q~U, and W which are the replacement source data are stored respectively in clusters a~d, e~i, j~m, n~r, and s which are replacement destination data. The reference numeral 305 denotes a DFL registration state at that time. As for the CRD, information is displayed in two lines as described above. Head addresses of contiguous replacement source clusters are indicated by 306 and 307, and end addresses of the contiguous replacement source clusters are indicated by 308 and 309. Furthermore, to be paired with the replacement source information, head addresses of contiguous replacement destination clusters are indicated by 310 and 312, and end addresses of the contiguous replacement destination clusters are indicated by 311 and 313. As for the RAD, information is displayed in one line. In the case of the RAD, the status 1 is represented by "0000b" whereas the status 2 is represented by "0000b," and the defective cluster first PSN indicates the head address of a replacement source cluster whereas the replacement cluster first PSN indicates the head address of a replacement destination cluster. As DFLs which indicate a defect in the user data area, there are a PBA (Possibly Bad Area) and an NRD (Non-Re-allocatable Defect) besides the RAD and CRD. A PBA-registered cluster means a cluster having a high possibility of being defective on the disc for a reason that it was handled as defective earlier and so on. In the PBA, the defective cluster first PSN indicates its head address, and the replacement cluster first PSN indicates the number of clusters having a high possibility of being defective beginning with the head cluster. A NRD-registered cluster means a cluster which has a high possibility of being defective for a reason that it could not be reproduced and so on and which has not data recorded in the replacement area. In the NRD, the defective cluster first PSN indicates an address of the cluster having a high possibility of being defective, and the replacement cluster first PSN is set to 0 and unused. Hereafter, the DFL is registered in the same way.

As described heretofore, the replacement processing is conducted by managing information such as the address of the replacement source judged to be defective, the address of the replacement destination which is the alternative recording destination, and the number of defective clusters.

Figure 4:
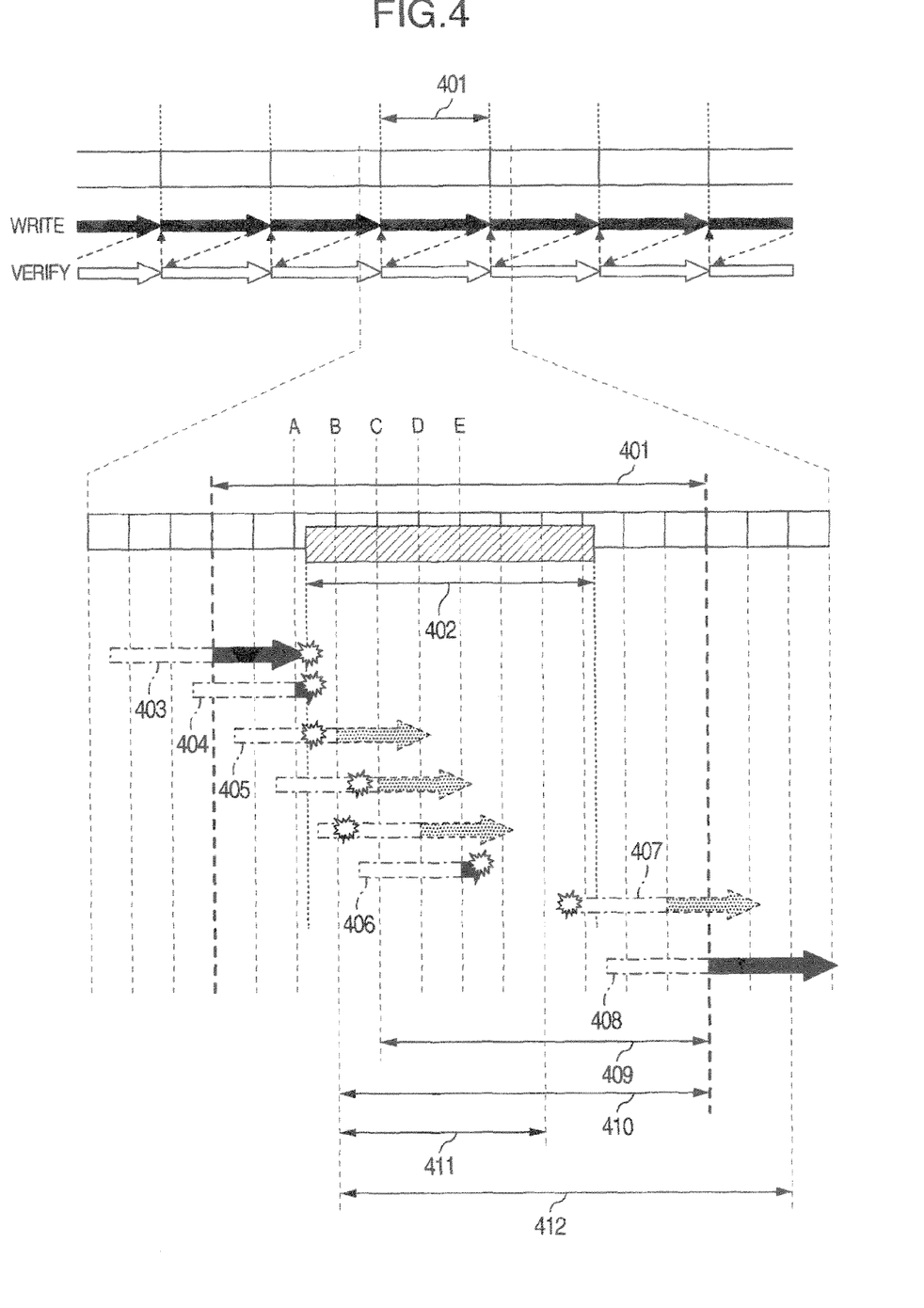
FIG. 4 is a diagram for illustrating a RAW processing and data transfer rate lowering.

Subsequently, the RAW processing will be described with reference to FIG. 4. When conducting recording on the optical disc, there are stream recording in which, even if an error occurs during the recording, the error is disregarded and the recording processing is continued, and the RAW processing in which, even if an error occurs during the recording, the recording processing is continued while conducting recording to the replacement area. As described earlier, the RAW is the abbreviation of "Read After Write" and it literally means processing of conducting reproducing, that is, verification after recording. If a defective cluster in which data after recording cannot be reproduced normally is found, it becomes possible to continue the recording processing by recording the defective cluster in the replacement area even if an error is generated. Furthermore, typically, recording and verification are conducted repetitively by taking a predetermined block as the unit. In FIG. 4, a reference numeral 401 denotes the predetermined block unit. In an example illustrated in FIG. 4, the recording and the verification are repeated with a repetition period of 12 clusters. The case where a cluster of an RAW object is judged to be a defective cluster will now be described. This is broadly divided into two cases: a case where the cluster is judged to be defective because of an error generated during recording; and a case where the cluster is judged to be defective because of a verification error after the recording.

The latter cited defect caused by a verification error occurs in many cases when there is a problem in the medium quality or the control of laser power irradiated by the recording reproducing apparatus. However, it is considered that the former cited error generated during the recording is caused by a scratch or the like on the medium surface besides the above-described problem. For example, it is supposed that an area 402 is an area where an address (PAA: Physical ADIP (Address In Pre-groove) Address) required to conduct recording cannot be acquired because of a scratch on the medium surface, or processing such as seek processing for conducting recording in a target address or following processing for rendering following a track as far as the target address becomes unstable. When starting RAW processing for 401, verification for an RAW unit preceding 401 is finished, and as it is, a shift to recording processing for the range of 401 is conducted as indicated by an arrow of 403. As for the arrow of 403, the black part represents that recording is actually conducted and the part surrounded by a dot-dash line indicates the seek processing and the following processing. A reference numeral 403 represents that two head clusters could be recorded normally but a recording error occurred in a third cluster (address A). In this case, whether to retry the recording to the cluster A as represented by 404 or whether to handle the cluster A as an error cluster and conduct recording to a cluster B as represented by 405, depends upon the recording reproducing apparatus. No matter which specification the recording reproducing apparatus complies to, however, a shift to recording processing into the next cluster is conducted. If, for example, it is attempted to conduct the recording to the cluster A as represented by 404, however, the possibility that an error will occur during the seek processing or the following processing is low, but the possibility that an error will occur again during the recording is high, because the cluster A is in the range of the area 402. Furthermore, even if recording to the cluster B is attempted as represented by 405, the possibility that an error will be caused during the following processing before reaching the recording processing is high. In other words, in the range of the area 402, the possibility that an error will be caused is high if the seek processing, the following processing or the recording processing is involved. In the example shown in FIG. 4, there is a possibility that this state will continue up to a recording processing of 407. A state in which recording can be started is not obtained until a processing of 408 is conducted.

In this way, if an error in a servo system which is accompanied by seek processing occurs during recording, then the recording advances while conducting the time consuming seek processing in every cluster. Therefore, it takes a long time to conduct the recording. This time further increases if the area 402 where various kinds of processing become unstable is large or if the number of times of retry in a cluster in which an error has occurred increases or the number of times of the retry of seek processing increases. In other words, it is considered that a problem such as lowering of the recording transfer rate or occurrence of a timeout error from the host is caused.

Means for solving this problem will now be described with reference to the same FIG. 4.

It is now supposed that a recording error occurs in the cluster A during data recording in 403, followed by that recording is conducted as represented by 405. It is supposed that a recording error is caused when conducting recording as represented by 405, because the possibility that recording in the cluster B will not be able to be conducted due to a failure of following processing is high.

If recording errors occur consecutively in the cluster A and then in the cluster B in this way, a range of some extent in the cluster C and subsequent clusters is regarded as areas which are not suitable for recording processing. In other words, even if recording is conducted in the cluster C and subsequent clusters, the possibility of resulting in an error is high and only time is required. In that area, therefore, recording processing is not conducted, but processing is conducted handling those clusters as defective clusters internally. Internally handling the clusters as defective clusters means that DFL registration of the clusters handled as defective clusters is conducted by the DFL registration unit 108 shown in FIG. 1 in the same way as the actual recording error and the verification error, only without conducting actual recording processing or verification processing. For example, at the time point when recording errors have occurred in the cluster A and cluster B, all remaining clusters in the RAW unit beginning with the cluster C subsequent to the cluster B in which the recording error has occurred, that is, all clusters in a range 409, are handled internally as clusters in which recording errors have occurred without conducting actual recording processing. Owing to this processing, the recording processing can be omitted for areas for which the possibility that recording will not be able to be conducted even if recording is attempted is high. In other words, wasteful time can be saved and consequently lowering of the transfer rate can be prevented.

By the way, the designer can freely determine conditions of the internal error according to product specifications and product performance. For example, according to a possible condition, if an error in the servo system occurs in the cluster A in the recording in 403 and then an error in the servo system occurs in the cluster A in the recording in 404 as well again, that is, if a failure occurs in the same address a plurality of times, the range determined internally to be erroneous is set to 410 beginning with the cluster B. According to an alternative condition, if an error occurs in recording of the cluster A in the recording of 403, that is, if an error occurs even once, the internal error range is set to be 410 beginning with the cluster B. Or according to another possible condition, only when an error occurs again in a certain range from the cluster A where an error has occurred, it is handled internally as an error. For example, according to a condition, if an error occurs again within five clusters from a cluster which has first become erroneous, then subsequent clusters are handled internally as erroneous. In this case, if recording in the cluster B and the cluster C becomes OK and a recording error has occurred in a cluster D, then the condition is satisfied and consequently a cluster E and subsequent clusters are handled internally as erroneous.

Furthermore, the range handled internally as erroneous can also be determined freely by the designer according to the product specifications and product performance. For example, the range may be determined to last as far as the end of the RAW unit as represented by 409 and 410. Even if the range is determined by a predetermined number of clusters regardless of the RAW unit as represented by 411 or 412, there is no problem. The number of clusters regarded as internally erroneous differs according to specifications with regard to the range of 402 or the range of 401 supposed by the recording reproducing apparatus.

As a matter of fact, the range of 402 is not determined. In some cases, for example, the range of 402 extends over a plurality of RAWs. Even if specifications of 409 are adopted, it is insufficient in some cases. Even in such a case, however, there is no problem because a range in which recording becomes possible can be reached at last by repeating similar processing in the next RAW unit.

When the DFL registration unit 108 shown in FIG. 1 conducts DFL registration of the clusters handled as erroneous clusters, the same information as the DFL or information which indicates the range of erroneous clusters, such as, for example, an error generating address and the number of consecutive clusters internally handled as erroneous beginning with the error generating address, may be retained in the drive area recording reproducing unit 109 and recorded in the drive area of the recording medium at recordable timing. By doing so, it is possible to read out the DFL information from the drive area again even if the recording medium is re-formatted and the DFL information is eliminated. Even if the information taken in from the drive area is not in a format which can be subject to DFL registration, it becomes possible to generate the DFL information lost by re-formatting, again by converting the information to a DFL format in the DFL registration range determination unit 107.

Figure 5:
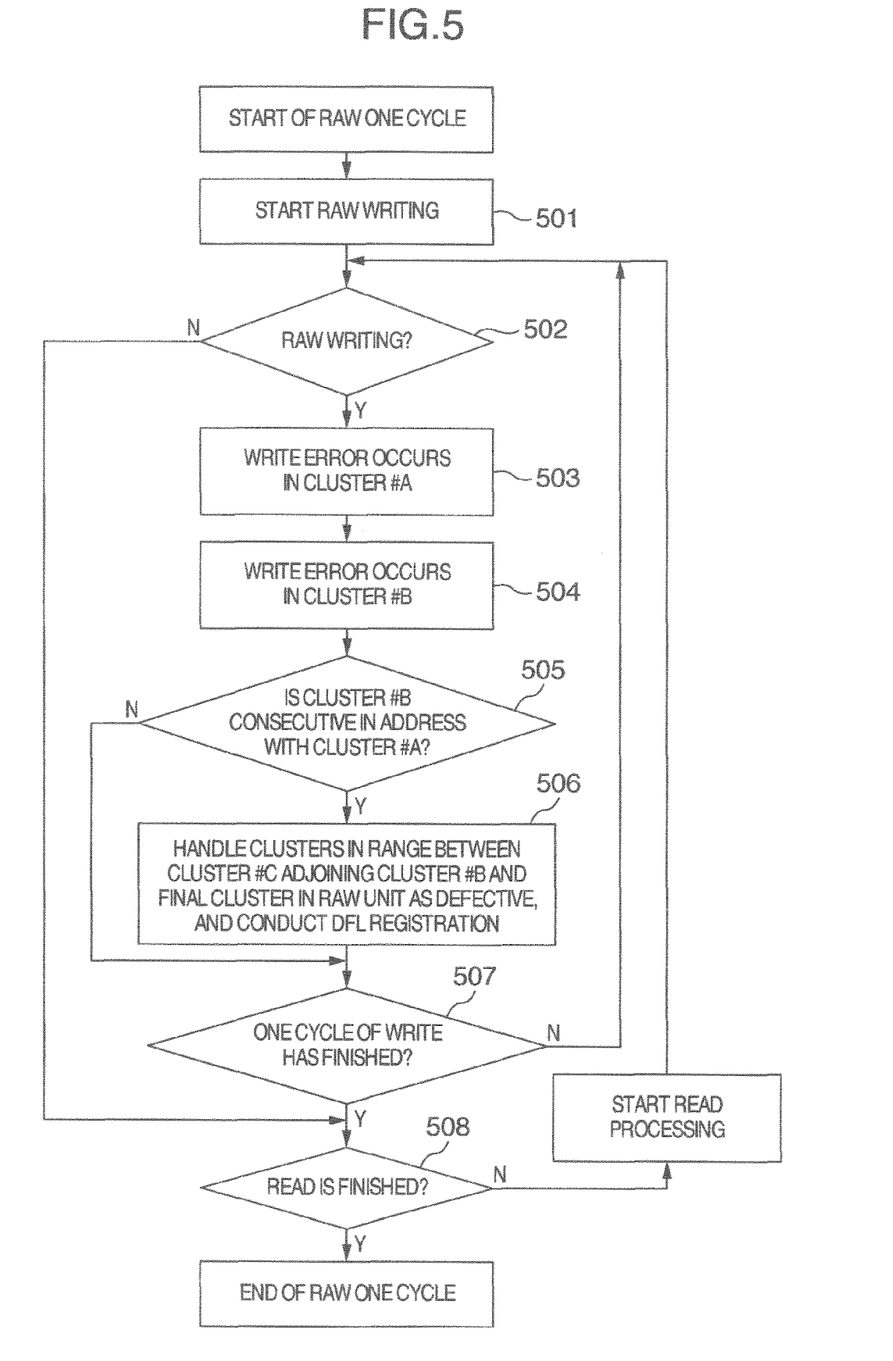
FIG. 5 is a flow chart for explaining the embodiment of the present invention.

Finally, an example of a DFL registration method in one cycle of RAW in the present embodiment will be described with reference to a flow chart represented in FIG. 5. Recording processing in one cycle of RAW is started (501). It is determined whether the processing is recording processing (502). It is supposed that the processing is recording processing as a result and a recording error has occurred in a cluster A under recording (503). It is supposed that the recording processing is then continued and a recording error has occurred in a cluster B (504). In this case, it is checked whether the error generating address in the cluster B is an adjoining address contiguous to the cluster A (505). If the condition is satisfied, then clusters in the range between a cluster C adjoining the cluster B in address which has become erroneous and a final cluster of the RAW unit are handled as defective without being recorded, and DFL registration is conducted (506). It is determined at 507 whether the recording processing in the RAW has finished. If up to the final cluster in the RAW unit is subjected to the DFL registration at 506, however, a shift to the processing in 508 is immediately conducted because clusters to be recorded do not remain in the RAW. It is determined at 508 whether reading (verification) processing has finished. As regards a cluster which was handled as a defective cluster without being recorded at 506 and which was not recorded, however, it is not necessary to reproduce (verify) the cluster. Therefore, the cluster is not handled as an object cluster of the reproducing (verification) processing. In other words, if the reproducing of the reproducing (verification) object clusters in the RAW is finished, the RAW block may be handled as finished in reproducing. Recording proceeds with repeating the operation described heretofore by taking the RAW cycle as the unit.

If an error has occurred in the recording processing, then according to the present invention subsequent recording reproducing processing is omitted in the predetermined range, and all blocks omitted in the recording processing are handled as defective blocks, DFL-registered, and recorded in the replacement area as described heretofore. It becomes possible to suppress wasteful recording processing accompanied by the seek processing in the RAW processing, and the problem of the lowered transfer rate is solved.

Furthermore, the values used in the present embodiment are nothing but an example. It is a matter of course that the same effects are obtained even if the values are changed.

Furthermore, the present embodiment has been described by taking the single layer rewritable optical disc as an example. As a matter of course, however, the same effects are obtained no matter whether the optical disc is a single layer optical disc or a multi-layer optical disc.

Furthermore, the present embodiment has been described by taking a rewritable medium as an example. The write once medium and the rewritable medium are different from each other only in whether various data are post-scripted or overwritten. Even if the present invention is applied to the write once medium, therefore, similar effects are obtained with respect to partial instances.

The present invention is not limited to the optical disc described in the embodiment. But it is a matter of course that the present invention can be applied to a recording medium as long as the recording medium has a concept of the replacement processing data recording area and the management information storage area, and the same effects are obtained.

It should be further understood by those skilled in the art that although the foregoing description has been made on embodiments of the invention, the invention is not limited thereto and various changes and modifications may be made without departing from the spirit of the invention and the scope of the appended claims.

If an error has occurred during recording, then, in the above-described embodiment, subsequent recording reproducing processing is omitted in the predetermined range, and all blocks omitted in the processing can be handled as defective blocks, DFL-registered, and recorded in the replacement area. Therefore, it becomes possible to avoid recording processing into blocks having a high possibility of resulting in recording errors. And it becomes possible to hold down the number of times of recording processing accompanied by the seek processing in the RAW processing, and the suppression of the transfer rate lowering can be implemented.

The invention claimed is:

1. A recording reproducing apparatus having a defect management function which conducts recording while repeating recording and verification alternately by using a medium having a user data area, a replacement area, and a management information storage area updated when using the replacement area, the recording reproducing apparatus comprising:
   a read after write unit comprising a data recording unit to record data and a data verification unit to verify recorded data;
   a registration range determination unit which determines a range to be subject to defect list registration into the management information storage area, on the basis of a result of recording or verification in the read after write unit;
   a list registration unit which conducts registration in the defect list on the basis of a result supplied from the registration range determination unit; and
   a replacement processing unit which controls the recording unit to record alternative data of defective blocks to the replacement area on the basis of a result of recording or verification;
   wherein the registration range determination unit handles a predetermined number X blocks (where X is a natural number) beginning with a recording error generation address in the data recording unit as defective blocks, a replacement processing unit controls the recording unit to record the alternative data of the X blocks to the replacement area on the basis of a result of recording or verification, and the list registration unit registers the X blocks into the defect list.

2. The recording reproducing apparatus according to claim wherein,
   when recording of data and verification of recorded data are conducted by taking a predetermined read after write block as a unit,
   when an address of an error which is generated for the first time in the read after write block while the data recording unit is recording data is A, a next error generating address is B, and an address adjoining the address B is C,
   when it can be judged that a difference in the number of blocks between the address A and the address B is equal to or less than a predetermined number Y of blocks (where Y is a natural number), the registration range determination unit handles a predetermined number X consecutive blocks (where X is a natural number) beginning with the address A, B or C as defective blocks without conducting actual recording and sets the X blocks as a defect list registration range.

3. The recording reproducing apparatus according to claim 2, wherein the number X of blocks (where X is a natural number) is a number of blocks between the address A. B or C and a final address in the read after write block.

4. The recording reproducing apparatus according to claim 1, wherein, when recording retry into the block of the address A using the data recording unit has exceeded a predetermined number of times, or when recording into the address A is not successful even if at least a predetermined time elapses after recording into a block of the address A starts, the registration range determination unit handles a predetermined number X consecutive blocks (where X is a natural number) beginning with the address A as defective blocks without conducting actual recording and determines the X blocks as a range to be registered into the defect list.

5. The recording reproducing apparatus according to claim 4, wherein the number X of blocks (where X is a natural number) is a number of blocks between the address A and a final address in the read after write block.

6. The recording reproducing apparatus according to claim 2, wherein
the recording medium has a drive area which is an area where the recording reproducing apparatus can freely conduct recording and reproducing,
the recording reproducing apparatus comprises a drive area recording reproducing unit capable of conducting recording and reproducing in the drive area, and
the drive area recording reproducing unit records defect information of a part or all of the address A, the address B, the address C, the number X of blocks (where X is a natural number), and the number Y of blocks (where Y is a natural number) into the drive area.

7. The recording reproducing apparatus according to claim 6, wherein, when a medium having the defect information recorded therein is attached, the drive area recording reproducing unit reads the defect information.

8. The recording reproducing apparatus according to claim 7, wherein the replacement processing unit controls the recording unit to record the alternative data of the X blocks to the replacement area on the basis of the defect list having an address of a defective block which has occurred in the user data area and an address of a replacement block recorded in the replacement area as replacement thereof described thereon,
wherein the recording reproducing apparatus conducts defect management processing on the basis of the defect information read by the drive area recording reproducing unit.

9. A recording reproducing method in a recording reproducing apparatus having a defect management function which conducts recording and reproducing by a predetermined recording block and a medium having a user data area, a replacement area, and a management information storage area updated when using the replacement area, the recording reproducing method comprising:
in recording processing in read after write processing in which recording processing and verification processing are repeated by a predetermined read after write block unit, handling a predetermined number X blocks (where X is a natural number) beginning with a recording error generation address A as defective blocks without recording therein;
conducting a replacement processing to record alternative data of the X blocks to the replacement area on the basis of a result of recording or verification; and
conducting DFL registration.

10. The recording reproducing method according to claim 9, wherein
when an address of an error which is generated for the first time in the read after write (RAW) block during data recording in RAW processing is A, a next error generating address is B, and an address adjoining the address B is C,
when it can be judged that a difference in the number of blocks between the address A and the address B is equal to or less than a predetermined number Y of blocks (where Y is a natural number), a predetermined number X consecutive blocks (where X is a natural number) beginning with the address A, B or C are handled as defective blocks, and the X blocks are registered in a defect list.

11. The recording reproducing method according to claim 10, wherein the number X of blocks (where X is a natural number) is a number of blocks between the address A, B or C and a final address in the read after write block.

12. The recording reproducing method according to claim 9, wherein, when number of times of recording retry into the address A has exceeded a predetermined number of times, or recording into the address A is not successful even if at least a predetermined time elapses after recording into a block of the address A starts, a predetermined number X consecutive blocks (where X is a natural number) beginning with the address A are handled as defective blocks without conducting actual recording, and the X blocks are registered into the defect list.

13. The recording reproducing method according to claim 12, wherein the number X of blocks (where X is a natural number) is a number of blocks between the address A and a final address in the read after write block.

14. The recording reproducing method according to claim 10, wherein
the recording medium has a drive area which is an area where the recording reproducing apparatus can freely conduct recording and reproducing, and
defect information of a part or all of the address A, the address B, the address C, the number X of blocks (where X is a natural number), and the number Y of blocks (where Y is a natural number) is recorded into the drive area.

15. The recording reproducing method according to claim 14, wherein when a medium having the defect information recorded therein is attached, the defect information is read.

16. The recording reproducing method according to claim 15, wherein, when conducting recording reproducing processing on the basis of the defect list having an address of a defective block which has occurred in the user data area and an address of a replacement block recorded in the replacement area as replacement thereof described thereon,
defect management processing is conducted on the basis of the defect information.

* * * * *